US009934631B2

(12) United States Patent
Weiss et al.

(10) Patent No.: US 9,934,631 B2
(45) Date of Patent: Apr. 3, 2018

(54) BIO-IMPLANTABLE IDENTIFICATION DEVICE AND CORRESPONDING OPERATING METHODS

(71) Applicant: WaveMarket, Inc., Emeryville, CA (US)

(72) Inventors: Andrew Weiss, San Ramon, CA (US); Scott Hotes, Berkeley, CA (US)

(73) Assignee: Location Labs, Inc., Emeryville, CA (US)

(*) Notice: Subject to any disclaimer, the term of this patent is extended or adjusted under 35 U.S.C. 154(b) by 493 days.

(21) Appl. No.: 14/461,934

(22) Filed: Aug. 18, 2014

(65) Prior Publication Data
US 2016/0049031 A1 Feb. 18, 2016

(51) Int. Cl.
G07C 9/00 (2006.01)
G06Q 20/32 (2012.01)
G06Q 20/20 (2012.01)
G06Q 20/38 (2012.01)
G06Q 20/40 (2012.01)

(52) U.S. Cl.
CPC ........ *G07C 9/00111* (2013.01); *G06Q 20/206* (2013.01); *G06Q 20/3278* (2013.01); *G06Q 20/3829* (2013.01); *G06Q 20/40145* (2013.01); *G07C 9/00119* (2013.01)

(58) Field of Classification Search
CPC ............ G07C 9/00111; G07C 9/00119; B60H 1/00742; G06Q 20/206; G06Q 20/3278
See application file for complete search history.

(56) References Cited

U.S. PATENT DOCUMENTS

| 5,491,787 A * | 2/1996 | Hashemi | G06F 11/1637 714/11 |
| 2007/0255374 A1* | 11/2007 | Kolafa | A61N 1/36082 607/118 |
| 2012/0172711 A1* | 7/2012 | Kerr | A61B 6/12 600/411 |
| 2012/0179306 A1* | 7/2012 | Saiki | B60R 25/2072 701/2 |
| 2014/0009262 A1* | 1/2014 | Robertson | A61B 5/0006 340/5.52 |

* cited by examiner

Primary Examiner — James Yang
(74) Attorney, Agent, or Firm — Dovas Law, P.C.

(57) ABSTRACT

A bio-implantable identification device configured for implantation in a user's body is provided. The bio-implantable identification device includes at least one memory configured to store a key, a receiver configured to receive an identification request, at least one processor configured to sign the identification request using the key stored in the at least one memory of the device, and a transmitter configured to transmit the signed request.

25 Claims, 5 Drawing Sheets

BIO-IMPLANTABLE IDENTIFICATION DEVICE AND CORRESPONDING OPERATING METHODS

BACKGROUND

The ability to determine the identity of an individual is a significant issue for security and personalization considerations. There are a variety of methods to make such a determination including facial recognition, signature authentication, password authentication, and device radio frequency identification (RFID). Each of these methods has limitations. Facial recognition requires prior knowledge of the person, a signature can be forged, passwords can either be forgotten or guessed, RFID devices (e.g., RFID key fobs) can become awkward to carry and can be lost.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A bio-implantable identification device configured for implantation in a user's body is provided. The bio-implantable identification device includes at least one memory configured to store a key, a receiver configured to receive an identification request, at least one processor configured to sign the identification request using the key stored in the at least one memory of the device, and a transmitter configured to transmit the signed request.

A method is provided which includes providing a bio-implantable identification device comprising at least one memory and at least one processor. The method further includes receiving an identification request with the identification device, signing by the at least one processor the identification request using a key stored in the at least one memory, and transmitting the signed request.

A method is provided comprising providing a processor-enabled bio-implantable identification device as a first device and a second device, the first device configured as a master device and the second device configured as a slave device subject to control by the master device. A software update is applied to the second device, configured as the slave device. The first device, configured as the master device, monitors the functioning of the second device, configured as the slave device, after the software update is applied to the second device. The first device validates the functioning of the second device based on the monitoring by the first device. The second device is reconfigured as the master device. The first device is reconfigured as the slave device subject to control by the master device. The first device, configured as the slave device, monitors the functioning of the second device, configured as the master device. The first device detects unacceptable functioning of the second device configured as the master device, and the second device is disabled responsive to detecting the unacceptable functioning.

BRIEF DESCRIPTION OF THE DRAWING(S)

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein.

DETAILED DESCRIPTION OF ILLUSTRATIVE EMBODIMENT(S)

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

The terms "a" and "an" as used herein do not denote a limitation of quantity, but rather denote the presence of at least one of the referenced items. Any directional signal such as top, bottom, left, right, upper and lower are taken with reference to the orientation in the various figures.

Figure 1:
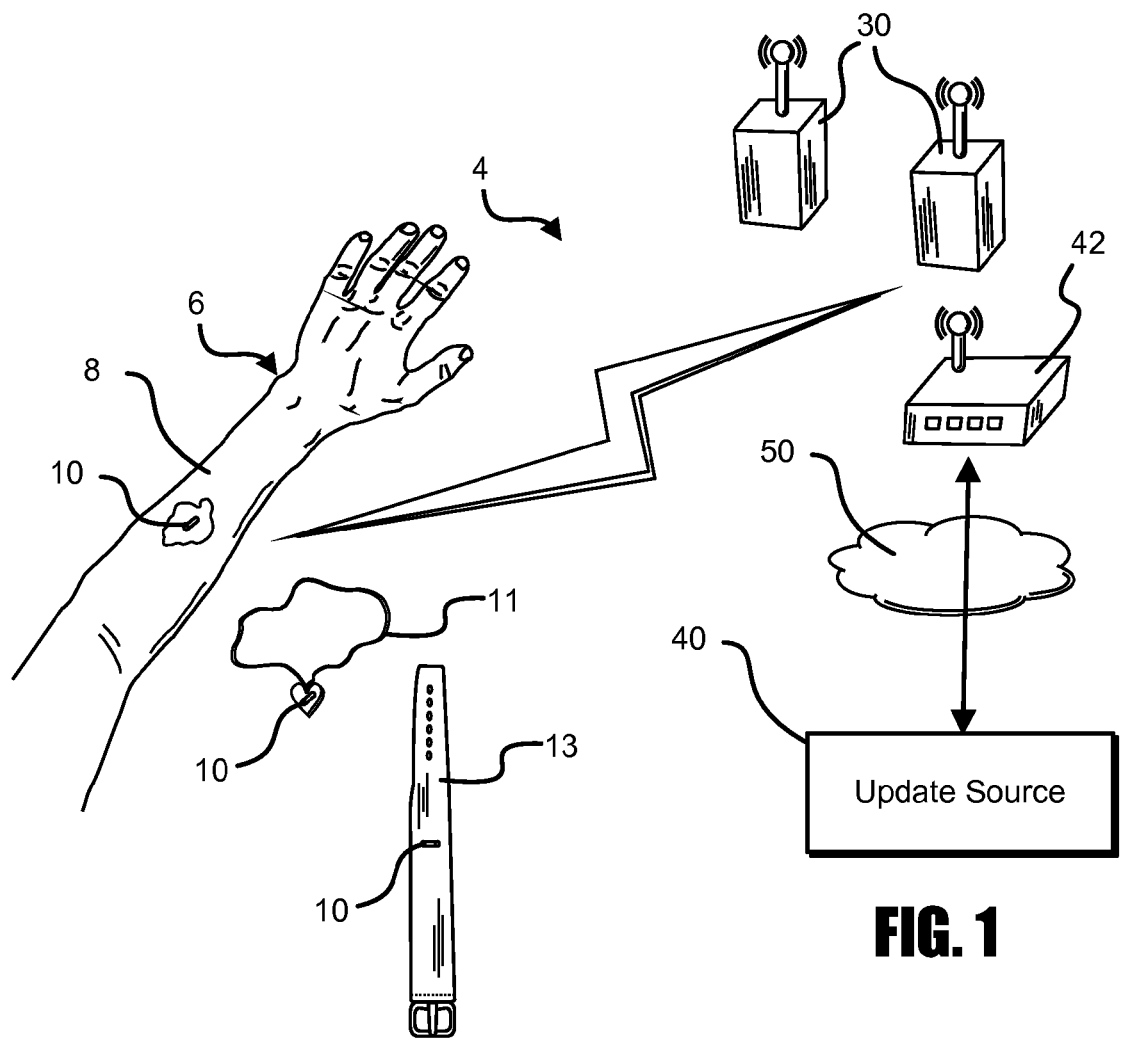
FIG. 1 is diagram showing an operating environment in which a bio-implantable identification device is enabled to communicate with a plurality of wireless communication systems.
Figure 2:
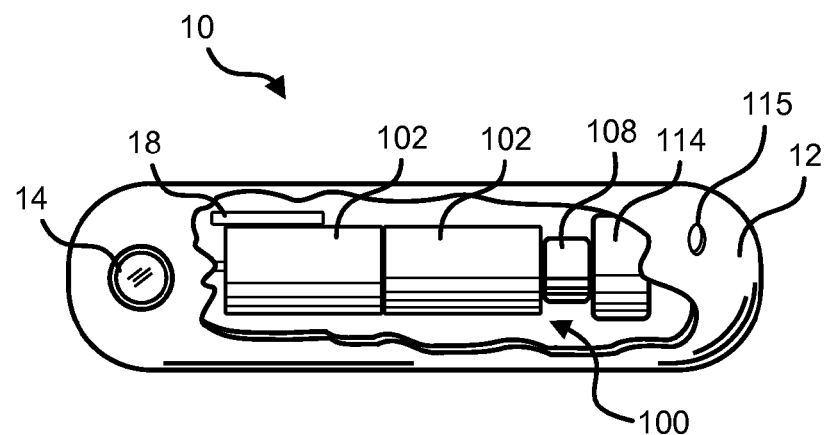
FIG. 2 is an enlarged cutaway view of the bio-implantable identification device of FIG. 1.

Referring to FIGS. 1 and 2 a bio-implantable identification device ("id device") 10 is shown. The id device 10 includes a housing 12 which houses hardware 102. The id device 10 is implantable under the skin 8 of a user, for example under the skin of a user's arm 6 as shown. The hardware 102 includes a light source 14 connected to the housing 12 which emits light through the skin 8 of the user alerting the user as to an operational status of the id device 10. The id device 10 operating in a wireless environment 4 can communicate with wireless-enabled request systems 30 configured to send identification requests to the id device 10. Alternatively, the id device 10 can be incorporated into an article of wear, such as a necklace or bracelet 11 or a wristband 13 as shown, which can be worn on the body, shoes or clothing of a user, such that implantation of the id device 10 under the skin of a user is not required.

Figure 3:
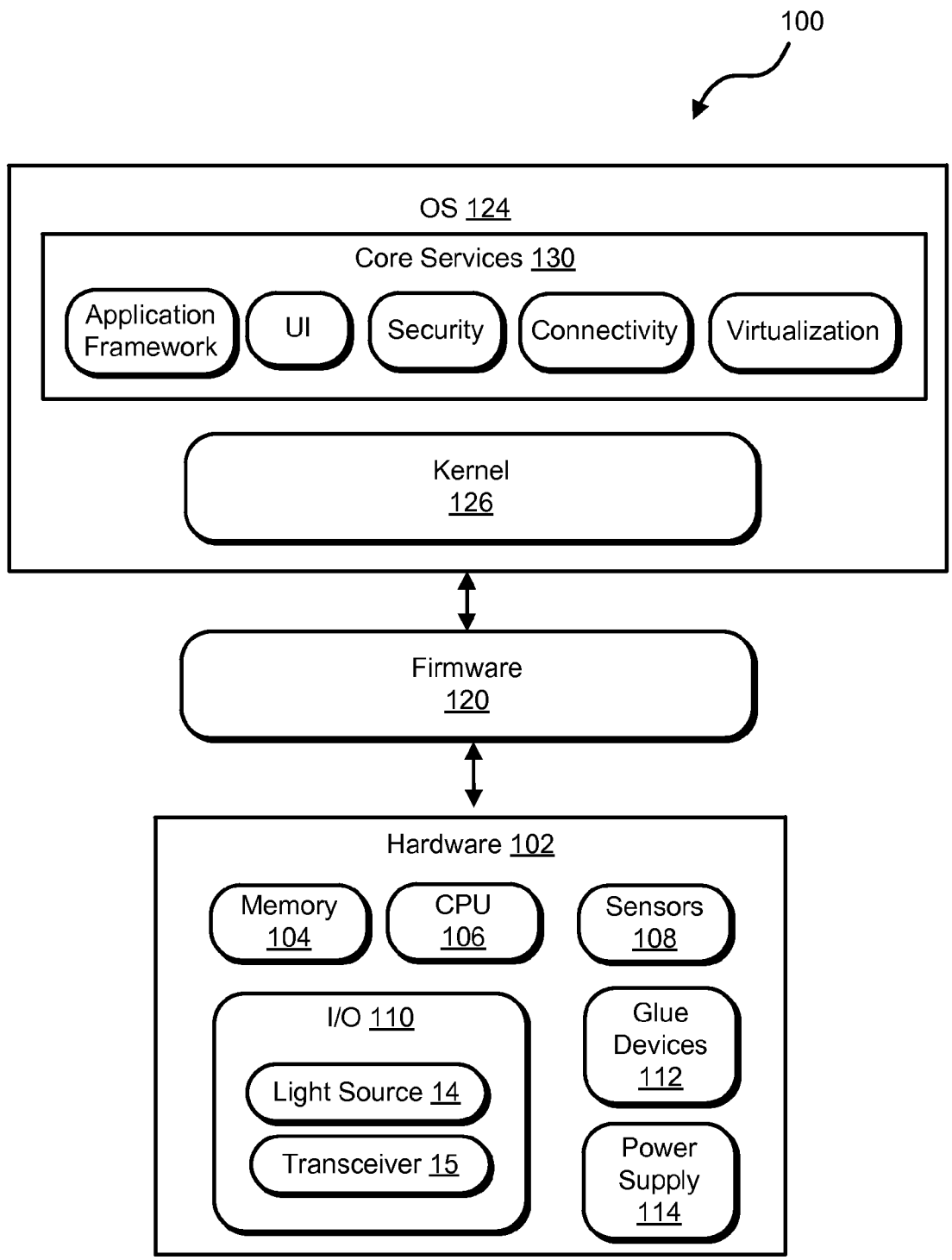
FIG. 3 illustrates an abstract hierarchical functional operation of an operational device of the bio-implantable identification device.

FIG. 3 illustrates abstract hierarchical operation of an operational device 100 of the id device 10 from basic hardware 102 devices to the higher level operating system 124. While an operational device 100 is illustrated, similar processor based systems exist in other devices. At the lowest abstraction level is a collection of basic semiconductor hardware 102 devices, typically integrated circuits. Such semiconductor hardware 102 typically includes one or more memory devices ("memory") 104, one or more processors ("CPU") 106, numerous sensors and their support electronics 108 (e.g., accelerometer, light sensor, proximity sensor, gyroscope, magnetometer), input/output ("I/O") 110 device support (e.g., light source 14 and drivers, RF transceivers 15), and glue devices 112 as required to change voltage levels or signal levels and to perform other interfacing as required for proper hardware 102 functionally. A power supply 114 can derive power for the id device 10 from a conventional battery, or alternatively, be connected to a user's circulatory system and derive power from blood glucose collected through aperture 115 in the housing 12. Alternatively, the power supply 114 can derive power through body motion.

Still referring to FIG. 3, the next level of abstract hierarchical progression is firmware 120, if required. Firmware 120 is useful for enabling upgrading of the operational device 100 by storing, in non-volatile memory, settings such as model numbers, version numbers, and controlling bits which establish a set of functions and limit or restrict the id device's capabilities.

Moving up the abstract hierarchical progression from the firmware 120 is an operating system 124. The operating system 124 provides a set of core software programs that manage the semiconductor hardware 102 and firmware 120 and implements common services required for application software. The operating system 124 includes a low-level "kernel" routine 126 that handles basic software integration to the firmware 120 and hardware 102 to implement underlying functions. The core services 130 are software functions that support the on-board services of the operational device 100. The core services 130 can include software routines that support and enable the application framework, user interface, system security, connectivity, and virtualization.

The id device 10 has wireless network communication capability for example Bluetooth™ protocol communication enabled by one or more RF transceivers 15. Using Bluetooth™ or other short range wireless protocol ensures that interactions with the id device 10 are constrained by proximity to the id device 10 and thus proximity to the user with the id device 10 implanted. The CPU 106 enables the id device 10 to participate in a secure electronic transaction protocol via wireless communication such as public key cryptography. Successfully completing a secure electronic transaction protocol between the id device 10 and a particular service may trigger an appropriate response from such service.

An important consideration for the id device 10 is reliability. Accordingly, the device 10 can be provided with multiple operational devices 100 wherein one operational device 100 is designated as a master and the other operational devices 100 are designated as slaves subject to control by the master device. The master and slave operational devices 100 each include separate computing, memory, networking, and power supply hardware, firmware, and software. Some hardware such as user light sources, transceivers, sensors can be provided separately for each operational device 100 or shared among the operational devices 100 depending on the required level of redundancy. An operational device 100 may include a physical device or a virtualized device, for example virtualized via core services 130 of a hardware-enabled operational device 100. At regular time intervals each operational device 100 will perform a self-check and a check on the other operational device(s) 100.

In an initialization process, the id device 10 is programmed with a universally unique identification ("ID") including a private key part of a secure electronic transaction protocol. The ID is embedded in the id device 10 and can include for example a one thousand digit number, making the chances of guessing the ID extremely small. The ID is not externally visible from the id device 10 and cannot be accessed externally. The private key is used to sign an identification request, and a requester using an associated public key can verify that the signed request originated from the id device 10. After it is programmed with the ID, the id device 10 is implanted in a person's body for example in their abdomen or forearm as shown in FIG. 1.

Figure 4:
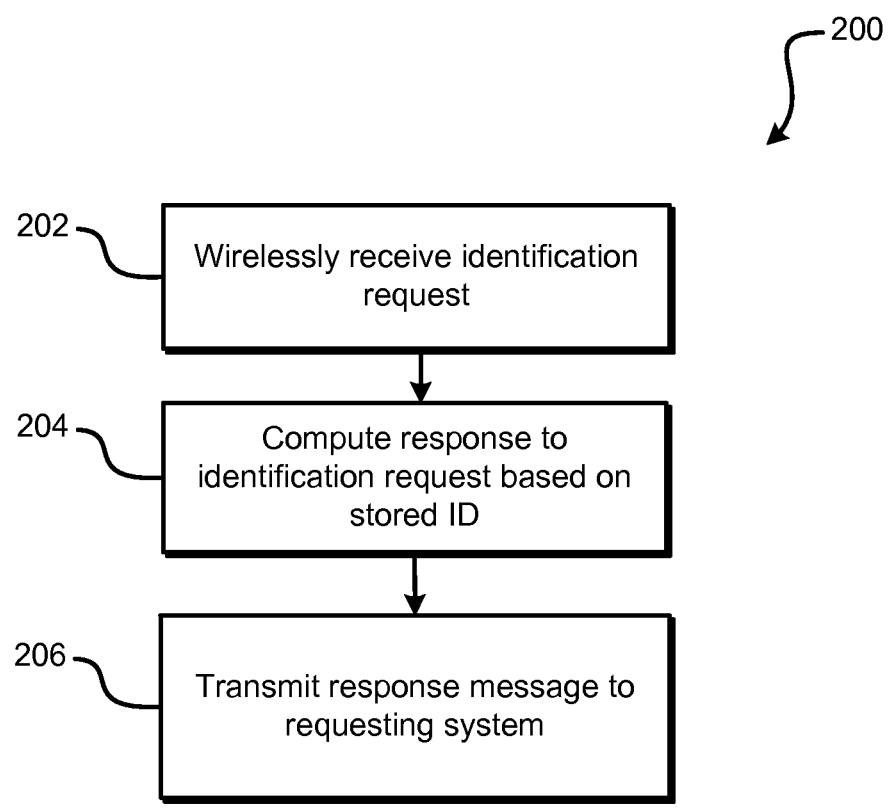
FIG. 4 is a flowchart showing a method for deriving a response by a bio-implantable identification device to an identification request.

Referring to FIG. 4, a flowchart shows a method 200 performed by the id device 10 via the CPU 106. While the method 200 and associated processes are described with reference to the components shown in FIG. 1, including the id device 10 and wireless-enabled request systems 30, the method 200 may alternatively be performed via other suitable systems. In a step 202 the id device 10 wirelessly receives an identification request through a secure electronic transaction protocol from a particular service enabled by a request system 30. In a step 204, the id device 10 via the CPU 106 computes a response to the request, using a stored ID as a basis for deriving the response. In computing the response the CPU 106 uses a private key stored in the memory 104 to sign the request. In a step 206 the id device 10 transmits a response message to the request system 30. The response message includes the signed request. The request system 30 receives the response message and determines if the response message demonstrates that the source of the response message (the id device 10) is a recognized entity.

To provide an indication that the id device 10 is active, the light source 14 emits light through the skin. The light source 14 includes a light emitting diode ("LED") or other suitable low power light source. The light source 14 can be turned on by the CPU 106 to indicate that the id device 10 is active and ready to accept identification requests, and the light source 14 can be turned off to indicate that the id device 10 is inactive and not ready to accept identification requests. Alternatively, the light source 14 can show a particular light pattern when active and another particular light pattern when inactive. Further, a user can activate and deactivate the light source based on a particular input.

To allow a user to enable or disable the id device 10 and/or the light source 14, one of the sensors 108 (e.g., accelerometer, proximity sensor, light sensor) can be configured to sense taps on the skin 8 under which the id device 10 is installed. The CPU 106 can detect patterns in the sensed taps. For example, eleven taps within a twenty second period can trigger enabling of the id device 10, thirteen taps within a twenty second period can trigger disabling of the id device 10, and 9 taps within a twenty second period can turn on or off the light source 14.

The id device 10 can receive identification requests from request systems 30 corresponding to a variety of different environments enabling different uses for the id device 10. In one example, a motor vehicle's computer can be programmed to determine which individuals are permitted to start the vehicle. If the response message from the id device 10 to a motor vehicle's request system 30 identifies a person from an internally maintained person list, the vehicle will start. Otherwise, the vehicle will not start.

In another example, the id device 10 can be used as the basis for a credit or debit validation, for example at the checkout area of a store. A request system 30 enabling a particular service is positioned at or near a store checkout area. A shopper with the id device 10 implanted under her skin makes a purchase at a store checkout area, the service performs a validation based on the response message from the id device 10 and charges an account corresponding to the shopper for the purchase. During the validation process, the store can additionally request an explicit acknowledgement such as signature or fingerprint from the shopper to indicate that the shopper explicitly agreed to the purchase.

In another example, the id device 10 can be used to enforce building security. When a person with the id device 10 implanted attempts to enter a locked or secured building or facility, a particular service enabled by a request system 30 validates who the person is based on a response message from the id device 10. If the identified person is authorized, the building or facility is unlocked or unsecured allowing the person to enter.

In another example, the id device 10 can be used to personalize a space. When a person with the id device 10 implanted enters a motor vehicle, a request service enabled by a request system 30 with an antenna in the vehicle seat validates who the person is based on a response message from the id device 10. The space around the vehicle occupant (e.g., driver) is configured based on pre-programmed preferences. Mirror positions, seat position, and cabin temperature can be adjusted based on the vehicle occupant's preferences. In another example, a particular service which identifies a particular person in a room via their implanted id device 10, can communicate with an entertainment system to play the type of music such person prefers in the room.

The instructions (e.g., software) for reading the private key and deriving a secure transaction response resides in execute only storage on the id device 10, so the instructions (e.g., software code) cannot be read, changed, or updated. This eliminates the possibility that the private key can be sent out of the id device 10.

Figure 5:
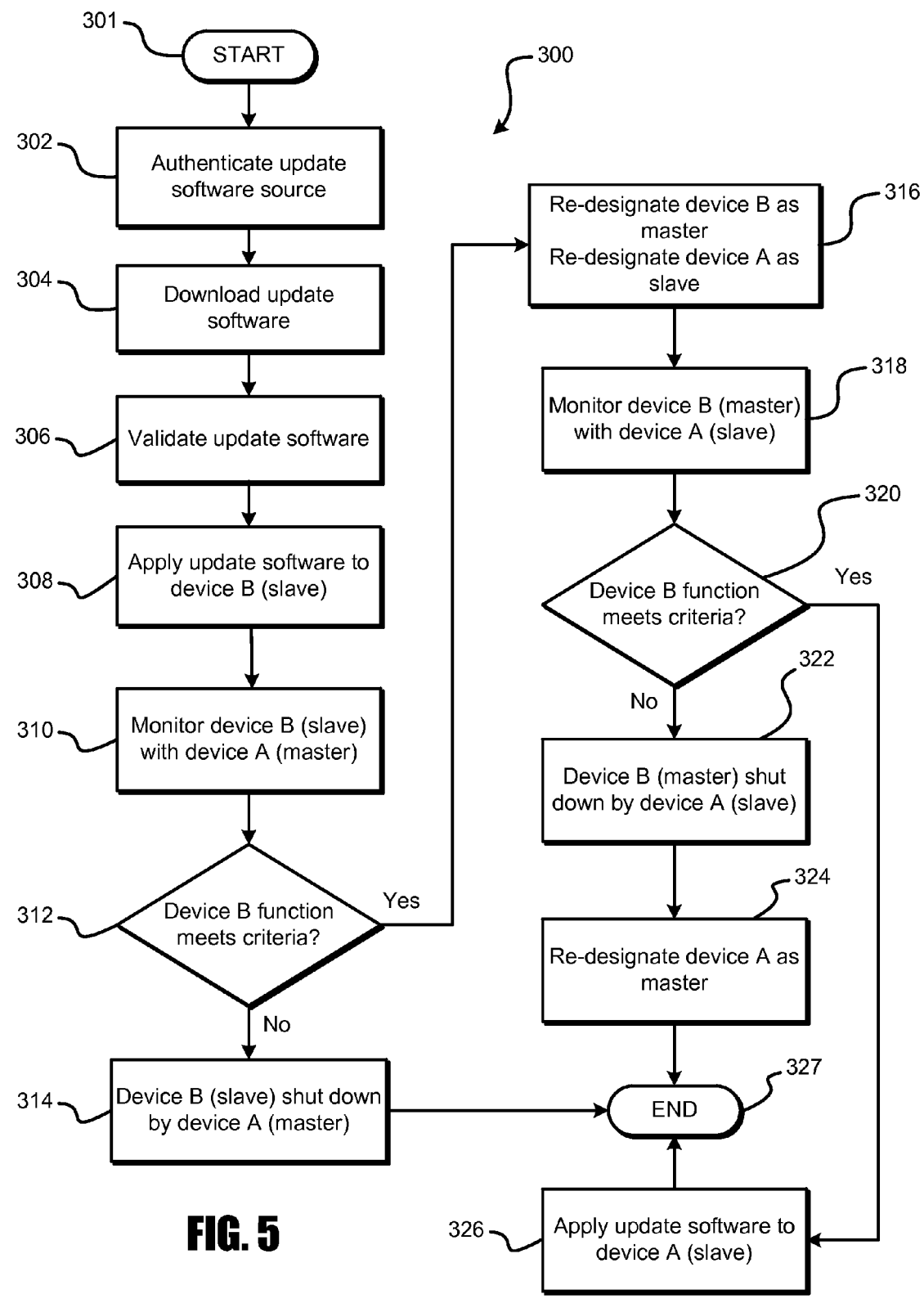
FIG. 5 is a flowchart showing a method for updating software of a bio-implantable identification device.

Updating the software code of the id device 10 leverages the advantage of employing multiple operational devices 100. Referring to FIG. 5, a method 300 for updating software on the id device 10 by the CPU 106 is shown. While the method 300 and associated processes are described with reference to the components shown in FIGS. 1-3, including the id device 10 and associated operational devices 100, the method 300 may alternatively be performed via other suitable systems. The method starts at step 301. In a step 302 the id device 10 authenticates a source 40 of update software, the update source 40 including for example a computing system accessible through the Internet 50 via a wireless access point 42. Authentication can be performed for example by employing public key infrastructure ("PKI") via a certificate authority ("CA"). After successful authentication of the update source 40, the id device 10 downloads update software from the update source 40 through the Internet 50 via the wireless access point 42 (step 304). The downloaded software is validated by CPU 106, for example using a key stored in the memory 104 (step 306).

Figure 6:
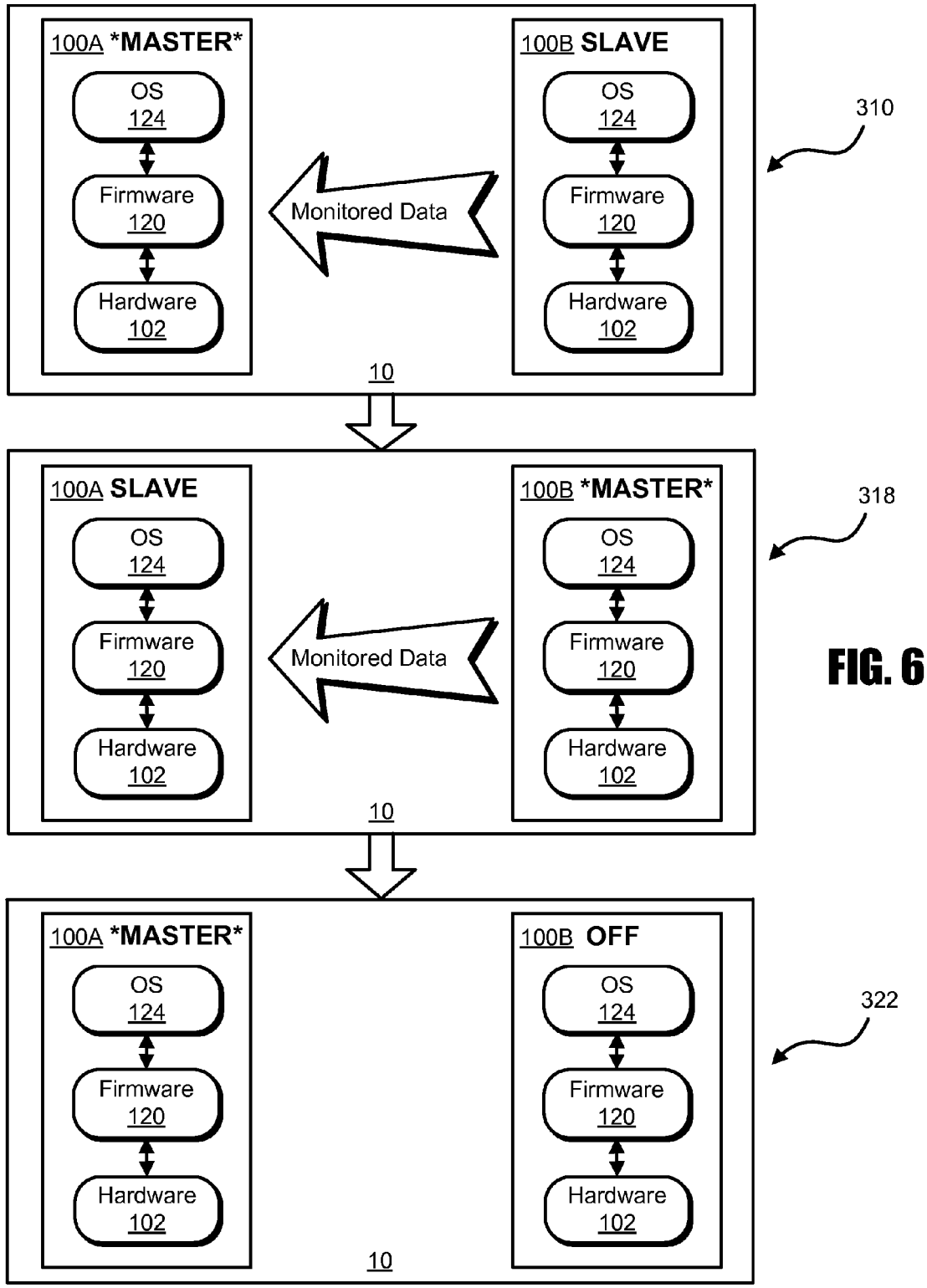
FIG. 6 shows relationships and communications between two operational devices of a bio-implantable identification device during performance of the method of FIG. 5.

FIG. 6 is now referenced showing an abstracted id device 10 comprising operational devices 100A and 100B. In a step 308 of the method, the update software is applied to the operational device 100B which is designated as a slave device subject to the control of a device designated as the master, operational device 100A. The operational device 100A (master) monitors the function of the operational device 100B (slave) (step 310), and it is determined by the operational device 100A (master) if the function of the operational device 100B (slave) meets particular accepted criteria (step 312). If the function of the operational device 100B (slave) with the applied update does not meet the accepted criteria, the operational device 100A (master) shuts down the operational device 100B (step 314). If the function of the operational device 100B (slave) meets the accepted criteria, then the operational device 100E is validated by the operational device 100A, then the operational device 100E is re-designated as the master device, and the operational device 100A is re-designated as the slave device subject to the control of the new master, operational device 100E (step 316). The operational device 100A (slave) monitors the function of the operational device 100E (master) (step 318), and it is determined by the operational device 100A (slave) if the function of the operational device 100E (master) meets accepted criteria (step 320). If the function of the operational device 100E (master) with the update does not meet the accepted criteria, the operational device 100A (slave) shuts down the operational device 100E (master) (step 322), and the operational device 100A is re-designated as the master device (step 324). If the function of the operational device 100E (master) with the update meets the accepted criteria, the update software can be applied to the operational device 100A (step 326). The method ends at step 327.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

What is claimed is:

1. A bio-implantable identification device configured for implantation in a user's body, the bio-implantable identification device comprising a first device and a second device and comprising:
    at least one memory configured to store a key;
    a receiver configured to receive an identification request;
    at least one processor configured to sign the identification request using the key stored in the at least one memory of the identification device; and
    a transmitter configured to transmit the signed request;
    wherein the first device is configured as a master device and the second device is configured as a slave device subject to control by the master device, the at least one processor further configured to perform a process based on instructions in the at least one memory, the process comprising:
    applying a software update to the second device, configured as the slave device;
    monitoring by the first device, configured as the master device, the functioning of the second device, configured as the slave device, after applying the software update to the second device;
    validating by the first device the functioning of the second device based on the monitoring by the first device;
    reconfiguring the second device as the master device;
    reconfiguring the first device as the slave device subject to control by the second device, configured as the master device; and
    monitoring by the first device, configured as the slave device, the functioning of the second device, configured as the master device.

2. The bio-implantable identification device of claim 1, further comprising a sensor configured to sense taps on skin of the body of the user, the identification device configured to be enabled and disabled based on sensed taps.

3. The bio-implantable identification device of claim 2, wherein the sensor comprises an accelerometer.

4. The bio-implantable identification device of claim 2, wherein the at least one processor is configured to enable and disable the identification device based on a particular pattern of taps.

5. The bio-implantable identification device of claim 1, further comprising a light source, the at least one processor configured to illuminate the light source based on whether the identification device is enabled or disabled.

6. The bio-implantable identification device of claim 1, further comprising execute only storage including instructions which enable signing of the identification request using the key.

7. The bio-implantable identification device of claim 6, wherein the at least one memory comprises the execute only storage.

8. The bio-implantable identification device of claim 1, the process, based on instructions in the at least one memory, further comprising:
   detecting by the first device unacceptable functioning of the second device configured as the master device; and
   disabling the second device responsive to detecting the unacceptable functioning.

9. The bio-implantable identification device of claim 8, the process, based on instructions in the at least one memory, further comprising reconfiguring the first device as the master device.

10. The bio-implantable identification device of claim 1, the process, based on instructions in the at least one memory, further comprising:
    authenticating a source of the update software; and
    downloading the update software using a secure transaction protocol.

11. The bio-implantable identification device of claim 1, wherein the first device and the second device comprise separate physical devices including separate processors and separate memories.

12. The bio-implantable identification device of claim 1, wherein at least one of the first device or the second device comprises a virtual device.

13. A method comprising:
    providing a bio-implantable identification device as a first device and a second device, the first device configured as a master device and the second device configured as a slave device subject to control by the master device, the bio-implantable identification device comprising at least one memory and at least one processor;
    receiving an identification request with the identification device;
    signing by the at least one processor the identification request using a key stored in the at least one memory;
    transmitting the signed request;
    applying a software update to the second device, configured as the slave device;
    monitoring by the first device, configured as the master device, the functioning of the second device, configured as the slave device, after the software update is applied to the second device;
    validating by the first device the functioning of the second device based on the monitoring by the first device;
    reconfiguring the second device as the master device;
    reconfiguring the first device as the slave device subject to control by the second device, configured as the master device; and
    monitoring by the first device, configured as the slave device, the functioning of the second device, configured as the master device.

14. The method of claim 13, wherein the bio-implantable identification device further comprises a sensor, the method further comprising:
    sensing with the sensor taps on skin of a body of a user in which the identification device is implanted; and
    enabling the identification device to receive the identification request based on the sensed taps.

15. The method of claim 14, further comprising:
    determining by the at least one processor that the sensed taps follow a particular pattern; and
    enabling the identification device to receive the identification request responsive to determining that the sensed taps follow the particular pattern.

16. The method of claim 13, wherein the bio-implantable identification device further comprises a light source, the method further comprising illuminating the light source by the at least one processor through skin of a body of a user in which the identification device is implanted to provide an operational status of the bio-implantable identification device.

17. The method of claim 13, further comprising executing instructions from an execute only storage of the identification device to enable signing of the identification request using the key.

18. The method of claim 13, further comprising:
    detecting by the first device unacceptable functioning of the second device configured as the master device; and
    disabling the second device responsive to detecting the unacceptable functioning.

19. The method of claim 13, further comprising:
    receiving the identification request from a motor vehicle computing system; and
    transmitting the signed request to the motor vehicle computing system to enable operation of the motor vehicle.

20. The method of claim 13, further comprising:
    receiving the identification request from a motor vehicle computing system; and
    transmitting the signed request to the motor vehicle computing system to activate pre-programmed environmental settings corresponding to a user of the bio-implantable identification device.

21. The method of claim 13, further comprising:
    receiving the identification request from a point of sale computing system; and
    transmitting the signed request to the point of sale computing system to authorize charging of an account of a user of the bio-implantable identification device for purchase of at least one of an item or a service.

22. The method of claim 13, further comprising:
    receiving the identification request from a building security computing system; and
    transmitting the signed request to the building security computing system to enable physical entrance of a user of the bio-implantable identification device into a restricted geographic area.

23. The method of claim 13, further comprising:
    receiving the identification request from a motor vehicle computing system; and
    transmitting the signed request to the motor vehicle computing system to activate pre-programmed environmental settings corresponding to a user of the bio-implantable identification device.

24. A method comprising:
    providing a bio-implantable identification device as a first device and a second device, the first device configured as a master device and the second device configured as a slave device subject to control by the master device, the bio-implantable device comprising at least one memory and at least one processor;
    applying a software update to the second device, configured as the slave device;
    monitoring by the first device, configured as the master device, the functioning of the second device, configured as the slave device, after the software update is applied to the second device;

validating by the first device the functioning of the second device based on the monitoring by the first device;

reconfiguring the second device as the master device;

reconfiguring the first device as the slave device subject to control by the second device, configured as the master device;

monitoring by the first device, configured as the slave device, the functioning of the second device, configured as the master device;

detecting by the first device unacceptable functioning of the second device configured as the master device; and disabling the second device by the first device responsive to detecting the unacceptable functioning.

25. The method of claim 24, the bio-implantable device further comprising a sensor and a light source, the method further comprising:

implanting the bio-implantable identification device under skin of a body of a user;

sensing with the sensor taps on the skin of the body of the user in which the identification device is implanted;

enabling the identification device to receive an identification request based on the sensed taps;

illuminating the light source by the at least one processor to show through the skin of the body of the user to provide an operational status of the identification device based on the sensed taps;

receiving the identification request with the identification device;

signing by the at least one processor the identification request using a key stored in the at least one memory; and transmitting the signed request by the identification device.

* * * * *